June 26, 1956 J. KOHL ET AL 2,752,067
INJECTOR
Filed Sept. 24, 1952

INVENTORS
JEROME KOHL
RICHARD L. NEWACHECK

BY

ATTORNEY

United States Patent Office 2,752,067
Patented June 26, 1956

2,752,067

INJECTOR

Jerome Kohl, Berkeley, and Richard L. Newacheck, Concord, Calif., assignors to Tracerlab, Inc., Boston, Mass., a corporation of Massachusetts Application September 24, 1952, Serial No. 311,174

5 Claims. (Cl. 222—80.5)

This invention relates to the utilization of radioactivity as a tracer in process equipment, and more particularly to apparatus for conveniently, safely, and quickly injecting tracer quantities of radioactive material into a pipe-line or other process equipment.

The conduct of many industries involves the use of process equipment wherein fluids of different quality are transmitted in a common pipe-line and in which it is desirable to follow and control the flow of these fluids. Specifically, in the petroleum industry, a single pipe-line is often used for the transmission of petroleum products of different grades to a distribution point at which the products are separated and transmitted to their respective storage tanks. The use of a common line for different materials presents the problem of tracing the position of the interface between two materials to insure timely operation of the proper valves to effect distribution of the two stocks without objectionable spill-over. An allied situation presenting the same problem is the use by several oil companies of a common pipe-line in transmitting their products from one part of the country to another. To provide proper separation of the stocks transmitted by different companies, means are necessary for indicating when the interface between the products of the two companies reaches the point of separation or distribution. A recently developed method of solving this problem involves the injection of tracer quantities of a radioactive solution at the interface of the products to be "tended," the radiactive material being carried through the system at the same rate as the interface and detected by suitable radiation detection devices as it approaches the distribution point. When the radiation intensity reaches a level predetermined by the amount of radioactive material injected, a control valve may be automatically or manually actuated to divert the product to the desired storage or branch pipe-line system. This method has met with considerable success, but the step of injecting the radioactive material into the pipe-line has cause some difficulty.

Applicants are aware of two systems for performing this important step of the method, but each has certain disadvantages as will immediately become apparent from the following brief description thereof. One of the systems is a portable field installation consisting of a pipe threaded to the pipe-line, a quick-acting valve backed by a chamber containing the radioactive solution, followed by a gauge glass and a second chamber containing a flushing solution. A large gas pressure tank is connected to the second volume chamber and supplies pressure to force the isotope and flushing solution into the pipe line when the quick-acting valve is opened.

The other system is of a more permanent nature in which a large quantity of radioactive material is stored in a volume chamber and is injected into the pipe line by pipefitting a small amount into an injector. This installation includes considerable shielding material and remote handling equipment to protect personnel working near the equipment, since enough radioactive material for several injections is stored in it.

A first basic disadvantage of these available systems is the requirement for large, expensive, and bulky field equipment to accomplish the injection step. Each system when in use, contaminates many pieces of equipment with radioactivity, and because of the size and arrangement of the equipment, is difficult to decontaminate. Moreover, these systems, and particularly the second, expose operating personnel to radiation from large sources and, accordingly, present a serious health hazard. Finally, in each system, filling of the fixed storage vessel with the radioisotope must be done without the convenience of radiochemical laboratory facilities.

Applicants with a knowledge and appreciation of these problems in the prior art have for an object of their invention the provision of an injector for injecting a radioactive solution into a pipe-line or other process equipment.

A further object of the invention is the provision of apparatus for rapidly injecting a radioactive solution into process equipment and substantially immediately thereafter automatically removing radioactive contaminants from the apparatus.

Another object of the invention is the provision of a small and relatively inexpensive apparatus for injecting a radioactive solution into proces equipment with a minimum of contamination of the apparatus.

Another object of the invention is the provision of an injector for the above purposes in which the radioactive solution is never openly exposed to personnel using the equipment.

A still further object of the invention is the provision of an injector having a removable cartridge which may be filled with radioactive solution and flushing solution and sealed in a radiochemical laboratory where complete safety equipment is available.

In the attainment of the foregoing objects, the injector constructed in accordance with the present invention comprises a chamber in which a cylinder containing the radioactive solution and flushing solution is removably placed, the two solutions being separated in the cylinder by a puncturable floating piston. On end of the cylinder is closed by a diaphragm and the other end is closed by a movable wall or piston. Means are provided for applying a pressure behind the latter piston causing the entire cylinder to be driven toward a sharpened tube which ruptures the diaghragm and allows the radioactive solution to be discharged through the tube and into the pipe-line. The movable wall and floating piston are then driven into the cylinder until the floating piston is also punctured by the sharpened tube to release the flushing solution, which cleans all radioactive material from the cylinder and carries it into the pipe line.

For additional objects and advantages, and for a better understanding of the invention, reference may be had to the accompanying drawing in which.

Figure 1:
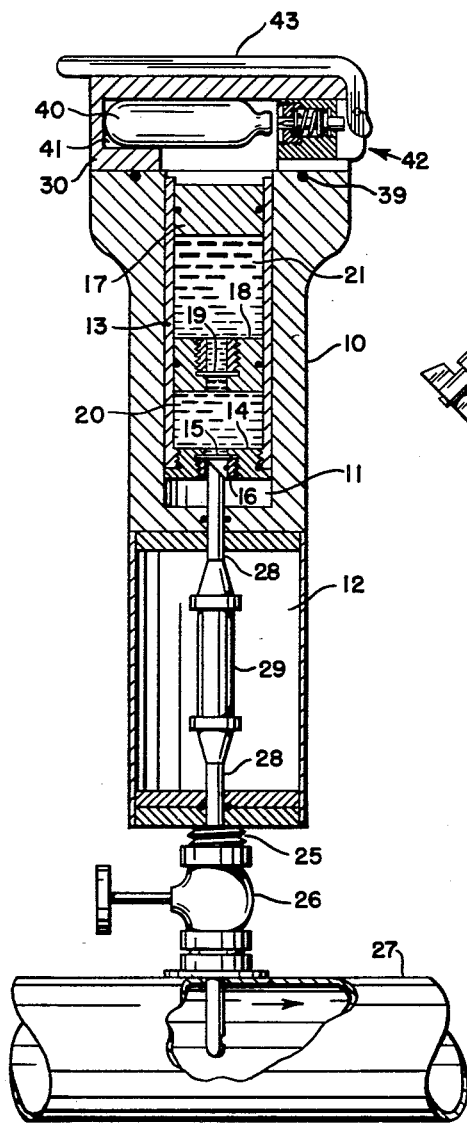
Fig. 1 is a cross-sectional elevation view of the injector.

Referring now to the drawing, and more particularly to Fig. 1, the injector comprises an elongated cylindrical chamber 10, constructed of steel or other suitable material, having two cavities formed therein, an upper cavity 11 of cylindrical shape, and a lower cavity 12. A cartridge having a cylindrical outer wall is positioned within cavity 11 and forms a sliding fit therewith to permit movement of the cartridge longitudinally of the cavity and easy removal from the chamber. The lower end of the cartridge is closed by a plug 14 threaded into the lower end of cartridge 13. Plug 14 has a central aperture therein normally closed by a puncturable diaphragm 15 held in place by a threaded insert 16. Diaphragm 15 may be constructed of "Teflon," "Neoprene," or other similar material so long at it is readily ruptured and is resistive to oil products. The upper end of cylinder 13 is closed by a movable wall or piston 17 formed of steel or other suitable material. The cartridge is divided into two volumes by a floating piston 18, formed of steel or similar material and has a central aperture therein normally closed by diaphragm 19, also held in position by a threaded plug. Pistons 17 and 18 are each provided with a "piston ring" to prevent the flow of liquid past it, suitable gaskets for this purpose being neoprene O rings. A similar gasket is used to insure a liquid tight seal between plug 14 and the cylinder 13.

The lower compartment of the cartridge contains a solution 20 of an oil soluble radioactive compound, preferably a gamma ray emitter. Oil soluble radioisotopes which have been found suitable for tracer applications in pipe-lines include cobalt naphthenate tagged with cobalt-60, barium soap, and triphenylstibene tagged with antimony-124. The quantity of active tracer material in the solution depends upon the length of line over which the oil is to be pumped between the injection and detecting stations, a typical range of activities being between .25 and 5 millicuries. Sufficient material to provide this activity is dissolved in a quantity of oil equal to the volume of the lower compartment, which may be of the order of magnitude of 20 cc. A flushing solution 21 is contained in the upper compartment of the cartridge, and preferably is oil of a grade compatible with the stock being transmitted in the pipe-line, but is not necessarily the same oil since the relatively minute amount of flushing solution injected into the line will not affect the quality of the pipe-line stock.

The lower end of chamber 12 is provided with a removably secured packing gland having a threaded connection 25 integrally formed therewith, the latter being adapted to be coupled into a valve 26, which in turn, is preferably permanently mounted on the exterior of the pipe-line 27 through which the oil to be tagged is transmitted. Tube 28, having a sharpened upper end forms a discharge passage for the radioactive solution 20 and flushing solution 21 and extends through lower cavity 12, through valve 26, and penetrates into pipe-line 27 to approximately the center line thereof. A check valve 29 is located in the tube 28 to prevent the flow of oil from pipe line 27 back into the upper cavity 11 of chamber 10.

Figure 2:
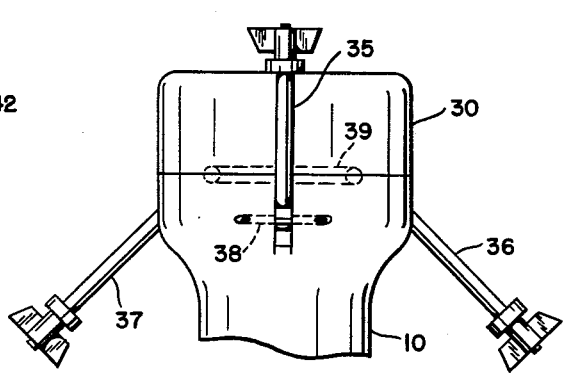
Fig. 2 is a partial elevation view of the injector illustrating a preferred arrangement for securing the cover on the chamber.
Figure 3:
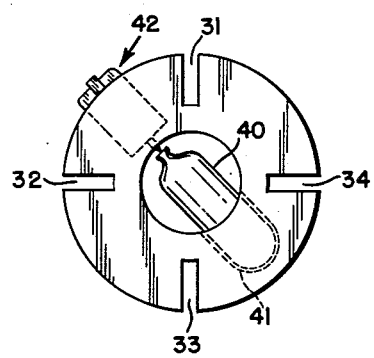
Fig. 3 is a plan view of the underside of the cover of the chamber.

Referring now to Figs. 2 and 3, chamber 10 is normally closed at its upper end by a cover 30 secured in position by quick-release anchor bolts. The cover consists of a flat piece of suitable material having a central internal cavity formed therein, as shown in Fig. 3. A plurality of rectangular notches 31, 32, 33, and 34 are equally spaced about the periphery of the cover for receiving a like plurality of anchor bolts, three of which are shown in Fig. 2 at 35, 36, and 37. Each of the anchor bolts is pivotally connected at its lower end on a pin 38 inserted tangentially through the upper portion of chamber 10, and when swung to its "up" position engages a notch in the cover, as shown. Cover 30 is secured to chamber 10 by tightening the wing nuts on the anchor bolts, a liquid and gas tight seal between the cover and the chamber being insured by an O ring gasket 39.

Mounted within the central cavity of cover 30, and held in place therein by radial depression 41, is a capsule 40 of compressed gas, preferably a carbon dioxide capsule of the type used for inflating life rafts. A release mechanism for the carbon dioxide capsule, consisting of a plunger assembly 42 to which an actuating handle 43 is pivotally connected, is mounted on cover 30. Upon lifting handle 43 away from the cover, the sharpened point of plunger 42 punctures capsule 40 to release the gas contained therein into the volume defined by the cover and the upper surface of piston 17.

In the utilization of the injector of the present invention, the valve 26, as mentioned above, is normally permanently mounted on the pipe-line in which a series of injections are contemplated. Preparatory to making an injection, connection 25 with its associated packing gland is threaded into valve 26, with tube 28 withdrawn to clear the valve stem in valve 26. Valve 26 is opened and tube 28 forced into the pipe through valve 26, and the cylindrical container of cavity 12 then secured to the packing gland. With cover 30 removed, a cartridge, previously filled with a suitable isotope and flushing solution, is inserted into chamber 10, a charged gas capsule is placed inside the cover, and the cover securely fastened in place. As the interface of two stocks of oil passes the injector, actuating handle 43 is lifted, releasing the compressed gas contained in capsule 40.

As the gas is released, pressure is exerted on the upper surface of piston 17 driving the entire cartridge downwardly over the sharpened end of tube 28 to rupture diaphragm 15 closing the lower end of the cartridge. Cartridge 13 is limited in its movement by the lower end of cavity 11, but the continued pressure on the upper surface of piston 17 causes the piston, and floating piston 18, to be driven into the cylinder thereby pushing the radioactive solution 20 into tube 28 and thence into the pipe-line 27. This action continues until floating piston 18 is also forced down over the sharpened end of tube 28 which ruptures diaphragm 19. Continued travel of piston 17 forces the flushing solution 21 into tube 28 carrying with it all of the radioactive material which may be lodged in the lower compartment of the cartridge or the tube and carries it into the pipe-line. The entire sequence of operations involved in emptying the cartridge takes place in a matter of a second thereby insuring that the radioactive solution is not distributed over any sizable volume of the oil being transmitted and accordingly affords essentially a point source of radiation.

When the injection operation is completed, chamber 10 may be left on the pipe-line in readiness for the next injection, or it may be removed, and valve 26 closed to prevent the flow of oil from the line. In either case, the cover 30 is removed, and the spent cartridge, which is essentially free of radioactive contamination, is removed from the chamber and taken to a radiochemical laboratory for insertion of new diaphragms 15 and 19 and refilling with a suitable isotope and flushing solution for the next operation. The filling operation is performed in a suitably shielded room, normally a part of the usual radiochemical laboratory, and the filled cartridge then placed in a shielded storage and carrying container in readiness for the next injection. Several interchangeable cartridges for each injector insure that a charged cartridge will always be on hand when needed, and since the isotopes used for tracer purposes have rather long half-lives, storage of the charged cartridges for reasonable periods does not result in serious diminution of their activity. The foregoing procedure for filling and handling the cartridge insures that only small sources of radioactivity are exposed to operating personnel, and then only for short periods of time, namely, the time required to transfer the cartridges from the storage container into the injector chamber. Even during this transfer, cylinder 13 affords some shielding, and, of course, the radioactive solution is never openly exposed to personnel using the injector.

The cartridge being relatively small and light in weight, remote handling apparatus may easily be designed for placing the cartridge into the injector and closing the cover on the chamber. The same handling equipment may also be used for actuating the carbon dioxide release mechanism, thereby permitting the entire injection operation to be carried on at a safe distance.

While applicants have disclosed a capsule of compressed gas as a convenient means for operating the injector, it is apparent that the invention is not limited thereto, but may be used with other forms of motive power for causing the desired movement of the cylinder and pistons, as, for example a suitably mounted spring. And while the injector has been described in connection with the injection of radioisotopes into pipe-lines, it is apparent that with suitable modifications in size and nature of certain components, particularly the tube 28, the injector may find application in the injection of other solutions, medicaments, for example.

Hence, while a particular embodiment of the invention is shown, it is to be understood that applicants do not wish to be limited thereto, and it is contemplated by the appended claims to cover any such modifications as fall within the true spirit and scope of the invention.

What is claimed is:

1. An injector comprising, in combination, an elongated chamber formed with an internal cylindrical cartridge-receiving cavity having one end closed, a cartridge positioned within said cavity, said cartridge being closed at one end by a puncturable diaphragm and closed at the other end by a movable piston and divided by a puncturable floating piston into first and second liquid-containing compartments, a sharpened discharge tube extending into said closed end of said cavity, said cartridge being longitudinally movable within said cavity and disposed with said diaphragm confronting the sharpened end of said tube, said tube extending into said cavity a distance such that the sharpened end thereof will puncture said diaphragm and said floating piston only when said one end of said cartridge is in contact with said closed end of said cavity and said floating piston is substantially in contact with said diaphragm, and a releasable source of motive power arranged when released to exert a continuing force on said movable piston first to move said closed end of said cartridge into contact with said one end of said cavity whereby said tube punctures said diaphragm and then to drive said movable piston within said cartridge to discharge the liquid from said first compartment into said discharge tube and to position said floating piston adjacent said diaphragm whereby said floating piston is punctured and the liquid from said second compartment is discharged into said discharge tube.

2. Apparatus for the successive injection of a radioactive solution and a flushing solution into a pipe-line comprising, in combination, an elongated chamber formed with a cylindrical internal cartridge-receiving cavity having one end closed, a cylindrical cartridge removably and slidably positioned within said cavity, said cartridge comprising an elongated cylinder closed at one end by a puncturable plug and at the other end by a piston movable within said cartridge and being divided into first and second compartments respectively containing a radioactive solution and a flushing solution by a puncturable floating piston, a hollow discharge tube having one end extending from said chamber for insertion into a pipe-line and other end extending into the closed end of said cavity, said cartridge being shorter than said cavity and positioned in said cavity preparatory to injection with said plug confronting the inwardly extending end of said tube, the inwardly extending end of said tube being of a length so as to puncture said plug and said floating piston only when said plug is in contact with said one end of said cavity and said floating piston is substantially in contact with said plug, and a releasable source of motive power arranged when released to exert a continuing force on said movable piston to cause successive puncturing of said plug and said floating piston and sequential discharge through said tube of said radioactive solution and said flushing solution.

3. Apparatus for the sequential injection of a radioactive solution and a flushing solution into a pipeline comprising, in combination, an elongated chamber formed with an internal cylindrical cartridge-receiving cavity, said cavity being closed at one end and provided with an aperture in said closed end, a discharge tube mounted to said chamber through said aperture having ends projecting inwardly and outwardly of said chamber, a cylindrical cartridge slideably disposed within said cavity, said cartridge comprising an elongated cylinder closed at one end by a puncturable diaphragm which confronts the inwardly projecting end of said discharge tube and closed at the other end by a piston arranged to slide longitudinally of said cylinder in sealing relation with the interior thereof and divided into first and second compartments by a puncturable floating piston positioned between said diaphragm and said piston and arranged to slide longitudinally of said cylinder in sealing relation with the interior thereof, said first compartment containing a radioactive solution and said second compartment containing a flushing solution, said inwardly projecting end of said tube being of a length to permit entry of said tube into said first compartment as said cartridge is pressed into contact with the closed end of said cavity and entry into said second compartment only after said floating piston has been pressed into contact with said diaphragm and said radioactive solution has been expelled into said tube, and a releasable source of motive power arranged when released to exert force on said piston first to press said cartridge into contact with said closed end of said cavity so that when said tube enters said first compartment, said piston and floating piston are caused to move longitudinally within said cylinder to expel said radioactive solution through said tube and to permit entry of said tube into said second compartment, whereupon further movement of said piston longitudinally within said cylinder expels said flushing solution through said tube.

4. Apparatus for the sequential injection of a radioactive solution and a flushing solution into a pipeline comprising, in combination, an elongated chamber formed with an internal cylindrical cartridge-receiving cavity, said cavity being closed at one end, a discharge tube having a sharpened end extending into said cavity from the closed end, a cylindrical cartridge removably disposed within said cavity and slideable longitudinally thereof, said cartridge comprising an elongated cylinder closed at one end by a puncturable diaphragm which confronts the sharpened end of said discharge tube and closed at the other end by a first piston arranged to slide longitudinally within said cylinder in sealing relation therewith, said cartridge being divided into first and second compartments by a puncturable floating piston, said first compartment containing a radioactive solution and said second compartment containing a flushing solution, said floating piston being arranged to slide longitudinally within said cylinder toward said diaphragm when said diaphragm is punctured, and a releasable source of motive power arranged when released to exert force on said first piston first to press said cartridge into contact with said closed end of said cavity and then to move said first and floating pistons longitudinally within said cylinder toward said diaphragm.

5. A cartridge for use with an injector having a cartridge-receiving cavity having one end closed and into which a sharpened discharge tube extends, said cartridge comprising an elongated cylinder closed at one end by a puncturable plug and at the other end by a first piston arranged to slide longitudinally of said cylinder in sealing relation with the interior thereof, a puncturable floating piston disposed intermediate said plug and said first piston dividing said cartridge into first and second compartments and arranged to slide longitudinally of said cylinder in sealing relation with the interior thereof, said first and second compartments being filled with a radioactive solution and a flushing solution, respectively, said floating piston being slideable to a position in contact with said plug to expel said radioactive solution through a discharge tube from said first compartment upon entry therein of said tube and to permit puncturing of said floating piston by said tube and entry thereof into said second compartment, said first piston being slideable to a position in contact with said floating piston to expel said flushing solution through said tube.

References Cited in the file of this patent

UNITED STATES PATENTS

| | | |
|---|---|---|
| 2,028,751 | Barton | Jan. 28, 1936 |
| 2,168,437 | Buercklin | Aug. 8, 1939 |
| 2,605,763 | Smoot | Aug. 5, 1952 |
| 2,655,919 | Goodstein et al. | Oct. 20, 1953 |